April 29, 1941. P. CÜPPERS 2,239,811
GROOVE TESTING PROCESS AND APPARATUS
Filed Jan. 11, 1939 2 Sheets-Sheet 1
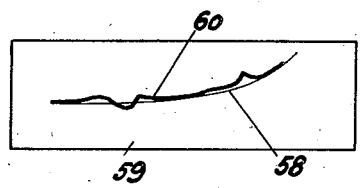
Fig. 5
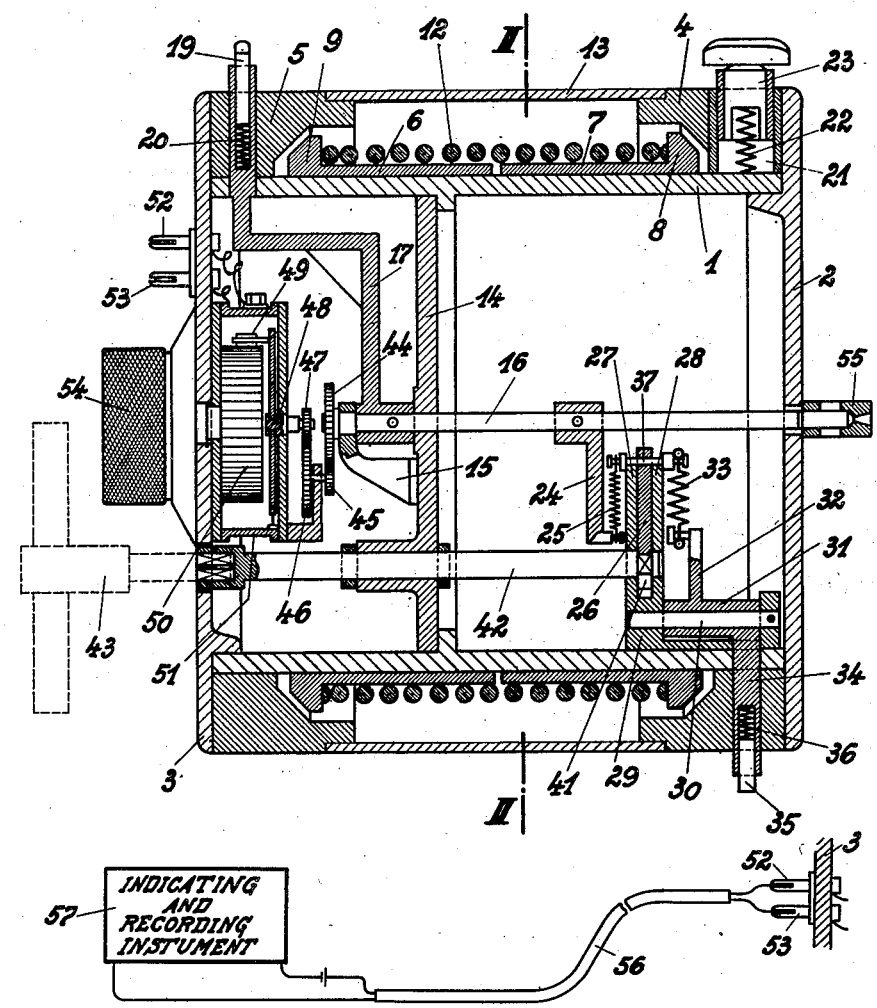
Fig. 1
Fig. 4
Inventor
Paul Cüppers
by Maréchal + Noe
Attys.

April 29, 1941.  P. CÜPPERS  2,239,811
GROOVE TESTING PROCESS AND APPARATUS
Filed Jan. 11, 1939   2 Sheets-Sheet 2

Inventor
Paul Cüppers
by Maréchal & Nox
attys.

Patented Apr. 29, 1941

2,239,811

UNITED STATES PATENT OFFICE 2,239,811

GROOVE TESTING PROCESS AND APPARATUS

Paul Cüppers, Augsburg, Germany, assignor to Maschinenfabrik Augsburg-Nurnberg A. G., Augsburg, Germany, a corporation of Germany Application January 11, 1939, Serial No. 250,406
In Germany January 19, 1938

11 Claims. (Cl. 177—311)

This invention relates to the testing of the angularity of a spiral groove of a grooved passage.

One object of the invention resides in the process of testing the angularity of a spiral groove in a grooved barrel or hollow workpiece, whereby a measurement is made of the relative angular displacement of a plurality of points along the groove and axially spaced apart a predetermined distance, a succession of such measurements taken throughout the length of the groove being employed in the preparation of a test curve which indicates any variation in the groove angle from an intended or desired form.

Another object of the invention is the provision of apparatus for testing the angularity of a spiral groove in accordance with the process mentioned, the apparatus comprising a plurality of groove-engaging feelers carried by a support which is adapted to move through the barrel or passage in the workpiece, the feelers simultaneously engaging the same groove at points axially spaced apart and controlling the operation of an indicator in accordance with the relative angular displacement of the feelers.

Another object of the invention is the provision of apparatus of the character mentioned, in which the support on which the groove-engaging feelers are mounted is provided with means for maintaining the groove-engaging feelers in contact with the same side surface of the groove in which they operate.

Other objects and advantages of the invention will be apparent from the following description, the appended claims, and the accompanying drawings, in which a preferred form of apparatus embodying and for carrying out the invention has been illustrated.

In the drawings:

Fig. 1 is a central longitudinal sectional view of the testing apparatus, the section being taken on the line 1—1 of Fig. 2;

Fig. 4 is a diagrammatic showing of the electrical connections to the indicating means; and Fig. 5 is a chart produced in accordance with the present invention.

Figure 2:
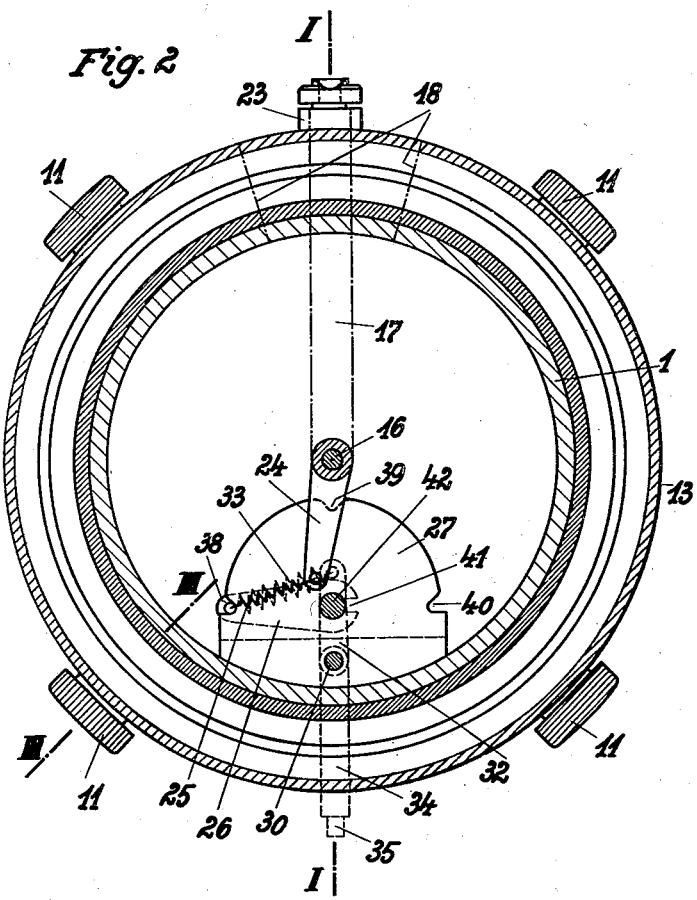
Fig. 2 is a sectional view on the line 2—2 of Fig. 1.

In accordance with the present invention the rifling or angularity of a spiral groove in a grooved barrel or hollow workpiece may be tested to determine the amount of any deviation from a desired angularity throughout the length of the groove and to determine the location of any deviation along the length of the workpiece. The angular displacement which exists between two points along the same groove that are axially spaced apart a predetermined distance is measured, a succession of such measurements being made throughout the length of the grooved barrel or passage while maintaining the same axial spacing of the points that are checked. If the groove is truly helical and the passage is cylindrical, the angular displacement of two points, which move one ahead of the other with a predetermined axial spacing and in contact with a side of the groove, will remain the same throughout the length of a groove, but if there are any errors in rifling or groove angle, they are readily detected by a deviation from the prescribed or proper angular relationship of the reference points. If the groove is arranged spirally or if its angle is of a non-uniform character, the angular displacement which takes place between two groove-engaging feelers operating along the same groove with a fixed axial spacing may be measured and compared with the values of the angles that should be shown if the groove is of the intended form.

This testing of the angularity or rifling of a spiral groove may be carried out by hand if desired, but making a large number of measurements over the entire length of the groove and then plotting the results to give a test curve for comparison with an ideal curve would require a great deal of time in the absence of any special measuring apparatus. Therefore, in accordance with the present invention, a measuring apparatus is employed to give a continuous register of the variations in angular displacement between a pair of groove engaging feelers as the apparatus is drawn through the grooved passage or barrel. Preferably the measurements of the angular displacement of the groove-engaging feelers at various points along the groove are plotted or charted by a suitable recording apparatus so as to give a test curve which indicates angularity of the groove at various points along its length, and this test curve may then be readily compared with a prepared ideal or desired curve so that the actual deviations of the groove angularity of the test curve may be readily seen by comparison with the desired curve.

The test apparatus, as shown in the drawings, comprises a drum-like supporting housing of such size that it may be moved axially through the grooved or rifled passage to be tested in a workpiece. This housing, as shown, comprises a shell 1, enclosed at its opposite ends by end disks 2 and 3. Ring pieces 4 and 5 are securely fastened to the shell 1 and to the end disks, the space between the rings 4 and 5 being enclosed by a cylindrical metal cover 13.

Figure 3:
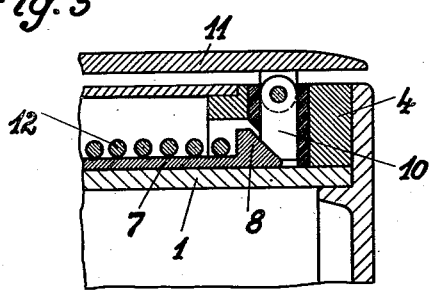
Fig. 3 is a sectional view on the line 3—3 of Fig. 2.

Slidably mounted on the shell 1 are sleeve bushings 6 and 7 having conical end portions 9 and 8 respectively, which are arranged in spaced relation inside of depressions provided therefor in the rings 4 and 5. There are a number of paired borings or radial passages in the rings 4 and 5, one of which is shown in Fig. 3, which slidably receives the extensions 10 which are articulated on spring-pressed guide members 11. As shown, four of these guide members are provided in suitable spaced relation. The inner ends of the extensions 10 are tapered and fit against the conically shaped portions 8 and 9 of the sleeve bushings, see Fig. 3. A spring 12 surrounding the sleeve bushings acts to yieldingly maintain the conical portions 8 and 9 in pressure engagement with the extensions 10 so that the guide members 11 are held outwardly in engagement with the cylindrical surfaces of the passage to be tested, and a correct centered position of the supporting housing is thus provided in the grooved passage.

Extending across the inside of the shell 1 is a wall 14, carrying a bracket 15, the wall and the bracket forming a support for a shaft 16 which extends centrally of the supporting housing. The shaft 16 also extends through and is supported by the end disk 2. Fixed to the shaft 16 is a lever 17, which reaches outwardly through a slotted passage 18 in the shell 1 and the ring 5, the outer portions of the lever carrying a feeler 19 adapted to engage in the groove of the workpiece to be tested. The feeler 19 is preferably held in lever 17 by means of a bayonet lock and a spring 20 which yieldingly resists inward axial movement of the groove-engaging feeler. The length of the slot 18 in which lever 17 operates is such as to permit considerable angular movement of the lever. The groove-engaging feeler 19 may thus operate along the same groove as a second feeler 23 which is non-rotatably supported adjacent the opposite end of the supporting housing as shown in Fig. 1, there being a predetermined axial spacing between the feelers 19 and 23. A bored passage 21 provided in the ring 4 in the same axial plane which contains the center of the slot 18 forms a support for the guide feeler 23, the latter preferably being held in place in the passage 21 by means of a suitable bayonet lock, and normally urged outwardly in a yielding manner by a spring 21.

The feelers 19 and 23 project out beyond the generally cylindrical surface of the supporting housing and are engaged in the same spiral groove of the workpiece, and as the supporting housing is drawn axially through the passage in the workpiece the relative rotational movements of the groove-engaging feelers 19 and 23 gives an indication of any change in the angularity of the groove along the length of the passage and shows the axial location of any errors in rifling. The rotational movements of the lever 17 are utilized to operate an indicating and recording device, as will be presently described, which gives a continuous indication as to any deviation of the lever from its initial angular arrangement with respect to the feeler 23 as the housing is drawn through the passage in the workpiece. As will be apparent, any variation in the helical angle of the groove produces a variation in the angular position of the lever 17.

Secured to the shaft 16 is an arm 24, the end of which is connected to an arm 26 by means of spring 25. The arm 26 is arranged between the two guide disk portions 27 and 28 of the stationary element 29 which is fixed to the shell 1 and which pivotally supports the shaft 30 of a double-armed lever 31. One arm 32 of the lever 31 is connected to arm 26 by means of a spring 33 which is somewhat stronger than the spring 25, the other arm 34 of the lever projecting, with some lateral freedom of movement, through a passage in the ring 4 and carrying a groove-engaging finger 35 at its outer end. The finger 35 is preferably held in place in the lever 34 by means of a bayonet lock, and a spring 36 normally urges the finger outwardly so that it may be maintained in engagement with a groove in the work-piece, preferably with the groove which is opposite to the groove engaged by the feelers 19 and 23.

The springs 25 and 33 are secured to the arm 26 by means of a pin 37 which passes through the end of the arm 26 and which is adapted to lie in any of the notches 38, 39 and 40 of the guide disks 27 and 28 so as to hold the arm 26 firmly in either of its end positions or in a middle position, Fig. 2 of the drawings showing the arm in one of its end positions while Fig. 1 shows it in its middle position. The arm 26 is adapted to move some little distance in the direction of its length to permit movement of the pin 37 into and out of the notches 38, 39 and 40, as it has a cut-out part 42 slidably engaging a square portion of the shaft 42. Shaft 42 is rotatably mounted in the wall 14 and in the end disk 3, the exposed end portion of the shaft 42 being socketed so that it may be engaged and turned by a key 43. As the shaft 42 is turned it produces a corresponding rotation of arm 26.

Fixed to the shaft 16 is a gear 44 forming a part of a speed-increasing transmission including drive gears 45, 46 and 47 which operate the shaft 48 at a speed which may be about twenty times the speed of shaft 16. Shaft 48 carries a movable contact element 49 operating on the surface of a resistance drum 50 which is arranged in a housing 51 secured to the disk 3. Wires connect two spaced contact or connection points 52 and 53 respectively to an end of the resistance drum 50 and the movable contact element 49, the arrangement being such that as the contact element 49 is moved the effective resistance of the drum 50 is varied. Resistance drum 50 is connected to a manually operable knob 54 so that the drum may be turned within its housing to give a desired indication on the indicator at the start of the test. As shown in Fig. 4, the contact points 52 and 53 are electrically connected by a suitable cable 56 to an electrical indicating and recording instrument 57 which may be supported in a desired fixed location adjacent the workpiece. The part of the recording instrument which moves the paper along, is so arranged as to move it at a speed equal to or proportional to the speed of axial movement of the testing device through the groove passage.

An attachment lug or fastener 55 is provided on the end disk 2 so that a pull rope or cable may be fastened to the housing and used to draw the housing through the passage in the workpiece.

The apparatus is introduced into the barrel or boring to be tested, with the groove engaging feelers 19 and 23 fitting in the same groove and the finger 35 fitting into a groove lying on the opposite side of the passage. The springs 20, 22 and 36 hold the feelers and fingers 35 in yielding engagement with the bottoms of the grooves. When the apparatus is introduced into the passage, the pin 37 to which the two springs 25 and 33 are connected lies in the middle notch 39 of the guide disks 27 and 28, and in this position the spring 33 exerts no substantial lateral force tending to swing the double-armed lever 31 on its pivot mounting, and the spring 25 exerts no substantial turning force on the shaft 16, so that the groove-engaging members may be readily applied to the grooves in the workpiece. Then, by turning the key 43, the shaft 42 is turned about 90°, thus swinging the arm 26 through a like angle, pin 37 being forced outwardly by the curved sides of the notch 39 and riding on the circular peripheral portions of the guide disks 27 and 28 until it engages the notch 38, taking the position as shown in Fig. 2. In this position of the arm 26 the spring 25 draws the lower end of the arm 24 to the left, thus acting yieldingly on the shaft 16 and moving the lever 17 to the right so that the groove-engaging feeler lies on the side surface of the groove into which its fits. At the same time the spring 33 draws the arm 32 of the lever 31 to the left and thus moves the arm 34 and its finger 35 to the right. The finger 35 is thus yieldingly urged into engagement with a side of the groove in which it operates. Since the lever 31 is adjustably supported in the housing of the apparatus the housing is yieldingly urged in a clockwise direction, and as a result, the feeler 23 is yieldingly urged against the same side of the groove which is engaged by the feeler 19. Both of the feelers 19 and 23 are therefore held against the same side surface of the same groove in a yielding manner. If the arm 26 is turned clockwise through 180° from the position shown on Fig. 2, so that pin 37 lies in the notch 40, then both of the groove-engaging feelers 19 and 23 will be pressed yieldingly against the other side of the same groove. Thus it is possible to test both sides of the groove individually.

Now, with both groove-engaging feelers 19 and 23 operating against the same side surface of the groove to be tested, the resistance drum 50 is turned by knob 54 so that the desired indication is obtained on the electrical indicating instrument 57, which is connected in series with resistance 50 and a suitable energizing source. The desired or ideal curve of the groove to be tested may be printed or applied to the recording paper employed in the recording apparatus, and the adjustment of the resistance 50 may be made so that the instrument recorder is made to coincide with the starting point of the desired or ideal curve on the paper. The testing apparatus is then drawn slowly through the passage in the workpiece, and as it moves along the passage, the feeler 19 will be moved from its initial position if there is any change in the angularity of the groove tested. The electrical recording instrument 57, which is responsive to the angular movements of the shaft 16, shows whether or not the groove tested is of non-uniform rifling or angularity and whether the groove angle corresponds throughout the length of the groove to a prescribed or desired rifling or grooving arrangement. If the groove is a true helix with a uniform angularity, the line produced on the recording instrument will be straight and correspond to the ideal curve 58 for example printed on the chart 59 shown in Fig. 5. If there is a more or less constant error in the groove angle a test curve such as the line 60 may be obtained, showing the deviation of the angularity of the groove from the intended or desired form. The test curve gives an indication not only as to the amount of deviation but also as to the position of the inaccurately formed parts of the groove, along the length of the passage. Also any errors in the intended form of the upper surfaces of the sides of the grooves shown on the test curve, and are readily to be distinguished from errors in the rifling angle, as they are shown by short and relatively abrupt rises on the chart line produced.

While the process herein described, and the form of apparatus for carrying this process into effect, constitutes a preferred embodiment of the invention, it is to be understood that the invention is not limited to this precise process and form of apparatus, and that changes may be made in either without departing from the scope of the invention which is defined in the appended claims.

What is claimed is:

1. Apparatus for testing the angularity of a spiral groove in a grooved barrel comprising a support adapted to move through the barrel, a pair of groove engaging feelers carried by said support for relative angular movement about the axis of the barrel and adapted for simultaneous engagement with the same groove at points axially spaced along the groove, and means responsive to relative angular displacement of said feelers for indicating deviations in the angularity of the groove tested.

2. Apparatus testing the angularity of a spiral groove in a grooved barrel comprising a support adapted to move through the barrel, a groove engaging feeler carried by said support, a second groove engaging feeler pivotally mounted on said support for movement about an axis extending longitudinally of the barrel, said feelers adapted for simultaneous engagement with the same groove at points axially spaced along the groove, means on said support for maintaining both of said feelers engaged with the same side surface of the groove, and means responsive to angular displacement of said second feeler for indicating deviations in the angularity of the groove tested.

3. Apparatus testing the angularity of a spiral groove in a grooved barrel comprising a support adapted to move through the barrel, a groove engaging feeler carried by said support, a second groove engaging feeler pivotally mounted on said support for movement about an axis extending longitudinally centrally of the barrel, said feelers adapted for simultaneous engagement with the same groove at points axially spaced along the groove, spring means on said support for maintaining said second feeler engaged with a side surface of the groove tested, spring means for urging said support for rotation in said barrel to maintain the first feeler engaged with the same side surface of the groove tested, and means responsive to angular displacement of said second feeler with respect to said support for indicating deviations in the angularity of the groove tested.

4. Apparatus testing the angularity of a spiral groove in a grooved barrel comprising a support adapted to move through the barrel, a pair of groove-engaging feelers carried by said support for relative angular movement about the axis of the barrel and adapted for simultaneous engagement with the same groove at points axially spaced along the groove, an electrical resistance carried by said support, means responsive to relative angular displacement of said groove-engaging feelers for varying said resistance, and an electrical indicator connected to said resistance and having indicating means responsive to variations of said resistance.

5. Apparatus testing the angularity of a spiral groove in a grooved barrel comprising a support adapted to move through the barrel, a groove-engaging feeler carried by said support, a second groove-engaging feeler, means on said support for mounting said second feeler for movement about the axis of the barrel, an electrical resistance carried by said support and having a movable contact element, speed-increasing means interconnecting said second feeler and said movable contact element, said feelers being adapted for simultaneous engagement with the same groove at different points axially spaced along the groove, and an electrical indicator electrically connected to said resistance and responsive to variations thereof.

6. Apparatus testing the angularity of a spiral groove in a grooved barrel comprising a support adapted to move through the barrel, a pair of groove-engaging feelers carried by said support for relative angular movement about an axis extending longitudinally of the barrel and adapted for simultaneous engagement with the same groove at points axially spaced along the groove, an electrical resistance carried by said support, means responsive to relative angular displacement of said groove engaging feelers for varying said resistance, an electrical indicator instrument remote from said support, and flexible wires connected to said resistance.

7. Apparatus testing the angularity of a spiral groove in a grooved barrel comprising a support adapted to move through the barrel, a pair of groove-engaging feelers carried by said support for relative angular movement about the axis of the barrel and adapted for simultaneous engagement with the same groove at points axially spaced along the groove, indicating means responsive to relative angular displacement of said feelers, an arm movably carried by said support and adapted to project into a groove opposed to the groove engaged by the feelers, and spring means interconnecting said arm and said support for yieldingly urging said support to rotate in the barrel.

8. Apparatus testing the angularity of a spiral groove in a grooved barrel comprising a support adapted to move through the barrel, a groove-engaging feeler carried by said support, a second groove-engaging feeler adjustably mounted on said support for movement about the axis of the barrel, said feelers being adapted for simultaneous engagement with the same groove at points axially spaced along the groove, an arm adjustably mounted in said support and having a groove-engaging end portion projecting therefrom, spring means between said arm and said support for yieldingly urging said support to hold the first-named feeler engaged with the side of the groove in which the feeler operates, and indicating means responsive to relative angular displacement of said groove-engaging feelers.

9. Apparatus testing the angularity of a spiral groove in a grooved barrel comprising a support adapted to move through the barrel, a groove-engaging feeler carried by said support, a second groove-engaging feeler adjustably mounted on said support for movement about the axis of the barrel, said feelers being adapted for simultaneous engagement with the same groove at points axially spaced along the groove, an arm adjustably mounted in said support and having a groove-engaging end portion projecting therefrom, spring means between said arm and said support for yieldingly urging said support to hold the first-named feeler engaged with the side of the groove in which the feeler operates, means operable to reverse the action of said spring means to urge the support in the opposite direction, and indicating means responsive to relative angular displacement of said groove-engaging feelers.

10. Apparatus testing the angularity of a spiral groove in a grooved barrel comprising a support adapted to move through the barrel, a groove-engaging feeler carried in a fixed location on said support, a second groove-engaging feeler rotatably mounted on said support for movement about an axis extending longitudinally of the barrel, said feelers being adapted for simultaneous engagement with the same groove at points axially spaced along the groove, a spring urging the second feeler against a side of the said groove, a groove-engaging arm adjustably carried by said housing, a spring for urging said arm in a direction to hold the first-named feeler engaged with the side of the groove engaged by the second feeler, a common anchorage member connected to both of said springs, means for operating said anchorage member to simultaneously reverse the action of both of said springs, and indicating means responsive to relative angular displacement of said feelers.

11. Apparatus testing the angularity of a spiral groove in a grooved barrel comprising a support adapted to move through the barrel, a groove-engaging feeler carried in a fixed location on said support, a second groove-engaging feeler adjustably mounted on said support for movement about an axis extending longitudinally of the barrel, said feelers being adapted for simultaneous engagement with the same groove at points axially spaced along the groove, an arm adjustably mounted in said support and having a groove-engaging portion projecting therefrom, a spring connected to said arm for yieldingly urging said support to hold the first-named feeler engaged with a side of the groove in which it operates, a second spring for urging said second feeler against the same side of the groove, an adjustably mounted spring anchorage connected to both of said springs, said anchorage having a normal position providing a substantially neutral position of said springs, manually operable means to move said anchorage to opposite sides of its normal position, and means responsive to relative angular displacement of said gaging feelers.

PAUL CÜPPERS.